(12) United States Patent
Nishiyama et al.

(10) Patent No.: US 9,162,858 B2
(45) Date of Patent: Oct. 20, 2015

(54) BATTERY-POWERED FORKLIFT

(75) Inventors: Kouji Nishiyama, Oyama (JP);
Kazuhiro Kurihara, Moka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/698,461

(22) PCT Filed: Mar. 13, 2012

(86) PCT No.: PCT/JP2012/056418
§ 371 (c)(1),
(2), (4) Date: Nov. 16, 2012

(87) PCT Pub. No.: WO2012/137581
PCT Pub. Date: Oct. 11, 2012

(65) Prior Publication Data
US 2014/0238780 A1 Aug. 28, 2014

(30) Foreign Application Priority Data
Apr. 8, 2011 (JP) .................................. 2011-086786

(51) Int. Cl.
*B66F 9/06* (2006.01)
*B66F 9/075* (2006.01)
(Continued)

(52) U.S. Cl.
CPC ........... *B66F 9/07572* (2013.01); *B66F 9/0754* (2013.01); *B66F 9/07545* (2013.01); *B60R 16/04* (2013.01); *B60S 5/06* (2013.01)

(58) Field of Classification Search
CPC . B66F 9/07531; B66F 9/0754; B66F 9/07554
USPC .......... 187/222; 182/68.5; 414/629, 631, 345, 414/396, 401; 180/68.5

IPC .... B66F 9/06,9/075; B60R 16/04, 21/11; B60S 5/06
See application file for complete search history.

(56) References Cited

U.S. PATENT DOCUMENTS 3,610,359 A * 10/1971 Becker ......................... 180/68.5
3,721,353 A    3/1973 Erickson
(Continued)

FOREIGN PATENT DOCUMENTS

| CN | 2297437 Y | 11/1998 |
|---|---|---|
| CN | 101379249 A | 3/2009 |

(Continued)

OTHER PUBLICATIONS

AIPN, Machine Translation, JP 08 282 414 A, Aug. 4, 2014, pp. 1-5.*
(Continued)

*Primary Examiner* — Michael Mansen
*Assistant Examiner* — Stefan Kruer
(74) *Attorney, Agent, or Firm* — Locke Lord LLP

(57) ABSTRACT

To facilitate loading-unloading operation of a battery even when a large-sized battery is mounted, in a battery-powered forklift which is driven with power of a battery mounted on a vehicle body including a fork which is arranged at a front part of the vehicle body, a counter weight which is arranged at a rear part of the vehicle body, and a top plate which is supported at a position to cover an area above a driver seat via a pair of rear stays 44 extended upward from both sides of the rear part of the vehicle body, post members arranged in a raised manner at both sides of the counter weight guide movement of the battery along the front-rear direction of the vehicle body between the post members.

4 Claims, 9 Drawing Sheets

(51) Int. Cl.
*B60R 16/04* (2006.01)
*B60S 5/06* (2006.01)

(56) References Cited

U.S. PATENT DOCUMENTS

| | | | | |
|---|---|---|---|---|
| 4,026,378 | A | | 5/1977 | DePriester |
| 4,711,467 | A | * | 12/1987 | Link et al. ................. 280/785 |
| 4,834,424 | A | * | 5/1989 | Link ........................... 280/785 |
| 5,360,307 | A | * | 11/1994 | Schemm et al. ............ 414/343 |
| 5,585,205 | A | * | 12/1996 | Kohchi ......................... 429/99 |
| 5,760,569 | A | * | 6/1998 | Chase, Jr. .................... 320/104 |
| 7,712,563 | B2 * | | 5/2010 | Niebuhr ...................... 180/68.5 |
| 8,191,688 | B2 * | | 6/2012 | Bogelein et al. ............ 187/222 |
| 8,789,636 | B2 * | | 7/2014 | Nishiyama et al. ......... 180/68.5 |
| 2005/0255377 | A1 * | | 11/2005 | Kondo ........................ 429/100 |
| 2008/0006459 | A1 * | | 1/2008 | Niebuhr ...................... 180/68.5 |
| 2009/0283346 | A1 * | | 11/2009 | Katae et al. ................. 180/68.2 |

FOREIGN PATENT DOCUMENTS

| | | | |
|---|---|---|---|
| CN | 101811652 | A | 8/2010 |
| CN | 101987613 | A | 3/2011 |
| CN | 202704956 | U | 1/2013 |
| DE | 2161563 | A1 | 6/1972 |
| DE | 102008004653 | A1 | 4/2009 |
| GB | 2454067 | A | 4/2009 |
| JP | 08282414 | A * | 10/1996 ............. B60R 21/11 |
| JP | 2000226194 | A * | 8/2000 ............. B66F 9/075 |
| JP | 2001302192 | A * | 10/2001 ............. B66F 9/075 |
| JP | 2001316091 | A * | 11/2001 ............. B66F 9/075 |
| JP | 2002-308582 | A | 10/2002 |
| JP | 2003-118990 | A | 4/2003 |
| JP | 2005-041656 | A | 2/2005 |
| JP | 2010-047192 | A | 3/2010 |

OTHER PUBLICATIONS

AIPN, Machine Translation, JP 2001 316 091 A, Aug. 3, 2014, pp. 1-6.*

International Search Report dated Jun. 5, 2012, issued for PCT/JP2012/056418.

Office Action dated Nov. 14, 2013, issued for the German Patent Application No. 112012000063.3 and English translation thereof.

* cited by examiner

BATTERY-POWERED FORKLIFT

FIELD

The present invention relates to a battery type forklift driven with a battery which is mounted on a vehicle body.

BACKGROUND

Forklifts to perform loading-unloading and moving of packages respectively with a folk arranged at a front part of a vehicle body include a type to be driven with a battery mounted on the vehicle body. The above battery type forklift is advantageous in performing loading-unloading operation indoors owing to not causing problems of noise and exhaust gas compared to a type of being driven with an engine. However, it cannot be continuously used by replenishing fuel as the type of being driven with an engine and replacement with a full-charged battery is required when battery charges are decreased. Since a counter weight is arranged at a rear part of the vehicle body of forklift, loading-unloading of the battery is performed from a side face of the vehicle body, normally (e.g., see Patent Literature 1).

CITATION LIST

Patent Literature

Patent Literature 1: Japanese Laid-open Patent Publication No. 2002-308582

SUMMARY

Technical Problem

By the way, a larger battery is required to sufficiently ensure operating time of a forklift. Here, components structuring a vehicle body such as rear stays are arranged at a rear part of the forklift. Therefore, when a large-sized battery is mounted, loading-unloading of the battery from a side face of the vehicle body is required to be performed while avoiding interference with the vehicle body structuring components such as the rear stays. Accordingly, the operation becomes drastically complicated.

In view of the above situations, an object of the present invention is to provide a battery type forklift enabling to easily perform operation to load and unload a battery even when a large-sized battery is mounted.

Solution to Problem

To overcome the problems and achieve the object, according to the present invention, a battery type forklift which is driven with power of a battery mounted on a vehicle body, comprises: a fork arranged at a front part of the vehicle body; and a counter weight arranged at a rear part of the vehicle body, wherein the battery is mounted on the vehicle body in a state of being capable of being removed to a rear side of the vehicle body, and the counter weight comprises a guide unit which prevents sway of the battery in a right-left direction of the vehicle body when removing the battery and which guides movement of the battery along a front-rear direction of the vehicle body.

According to the present invention, post-like members protruded upward are arranged at both right and left sides of the counter weight, and the guide unit being the post-like members guides movement of the battery along the front-rear direction of the vehicle body between the post-like members.

According to the present invention, the post-like members are formed by casting integrally with the counter weight.

According to the present invention, the counter weight comprises an abutting portion which restricts movement of the battery to a rear side of the vehicle body when the battery is mounted on the vehicle body.

According to the present invention, a front end face of the post-like member is located at the front side from a rear end face of the battery in a state that the battery is mounted on the vehicle body.

According to the present invention, since a battery is mounted on a vehicle body in a state of being removed to a rear side of the vehicle body and a guide unit which prevents sway of the battery in the right-left direction of the vehicle body when removing the battery and which guides movement of the battery along the front-rear direction of the vehicle body is arranged at the counter weight, loading-unloading operation of the battery can be easily performed without causing interference with the counter weight and vehicle body structuring components such as rear stays.

DESCRIPTION OF EMBODIMENTS

Figure 1:
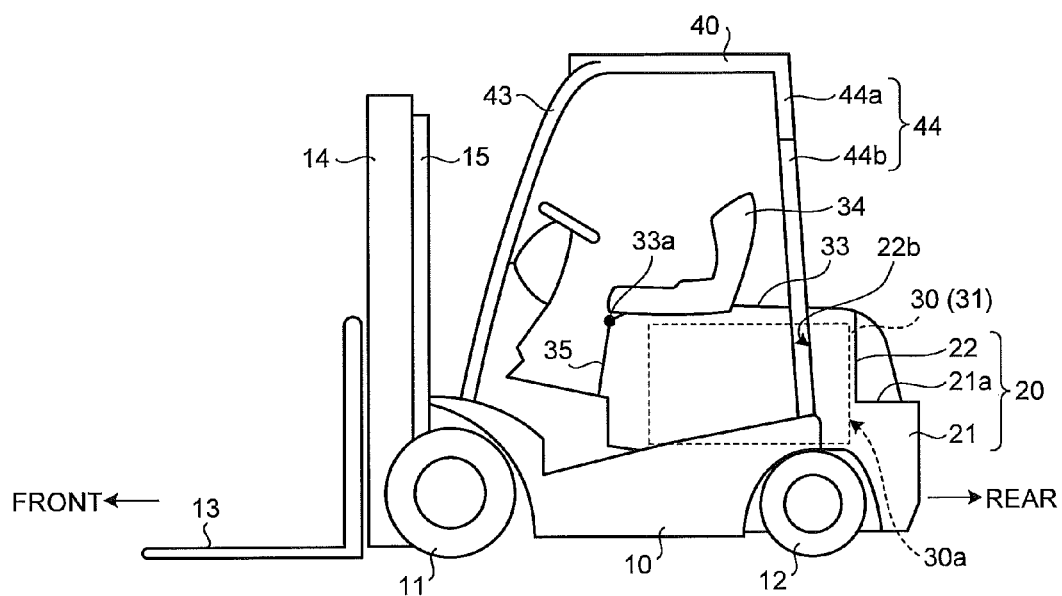
FIG. 1 is a side view of a battery type forklift of a first embodiment of the present invention.

In the following, preferable embodiments of a battery type forklift according to the present invention will be described in detail with reference to the attached drawings.

FIGS. 1, 2, 4 and 5 illustrate a battery type forklift of a first embodiment of the present invention. The battery type forklift exemplified here being provided with a front wheel 11 at each front end corner of a vehicle body 10 and a rear wheel 12 at each rear end corner of the vehicle body 10 drives as having the front wheels 11 as driving wheels with driving of an electric motor (not illustrated).

A fork 13 for performing loading-unloading and moving of a package is arranged at a front part of the vehicle body 10. The fork 13 is supported by a mast 14 which is arranged along the vertical direction and is capable of being raised and lowered along the mast 14 with driving of a mast cylinder 15 which is arranged at a space against the mast 14. Here, not illustrated in the drawing, the mast 14 is attached to the vehicle body 10 as being rotatable at a lower end part thereof about a horizontal axis along the right-left direction and is further provided with a tilt cylinder (not illustrated) at a space against the vehicle body 10 to be capable of having a frontward-tilted posture and a rearward-tilted posture against the vehicle body 10 with driving of the tilt cylinder (not illustrated).

Figure 3:
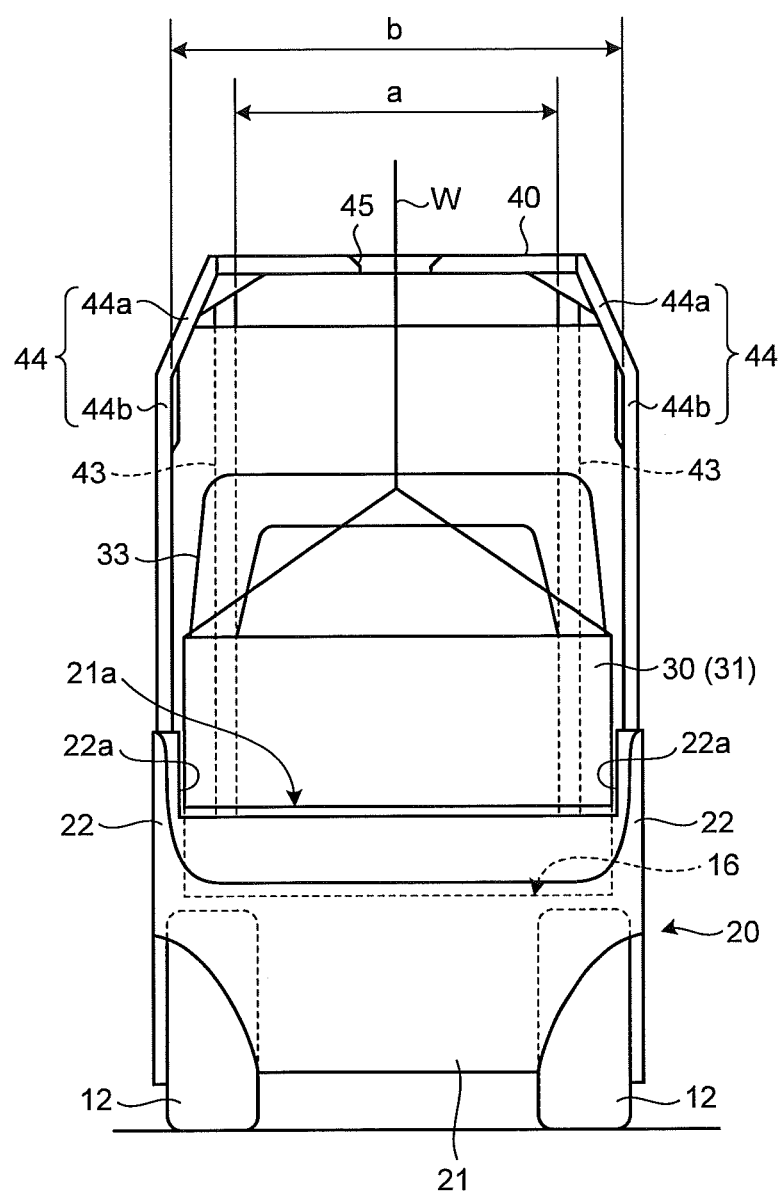
FIG. 3 is a rear view of a state that the battery is hoisted in the battery type forklift illustrated in FIG. 1.
Figure 4:
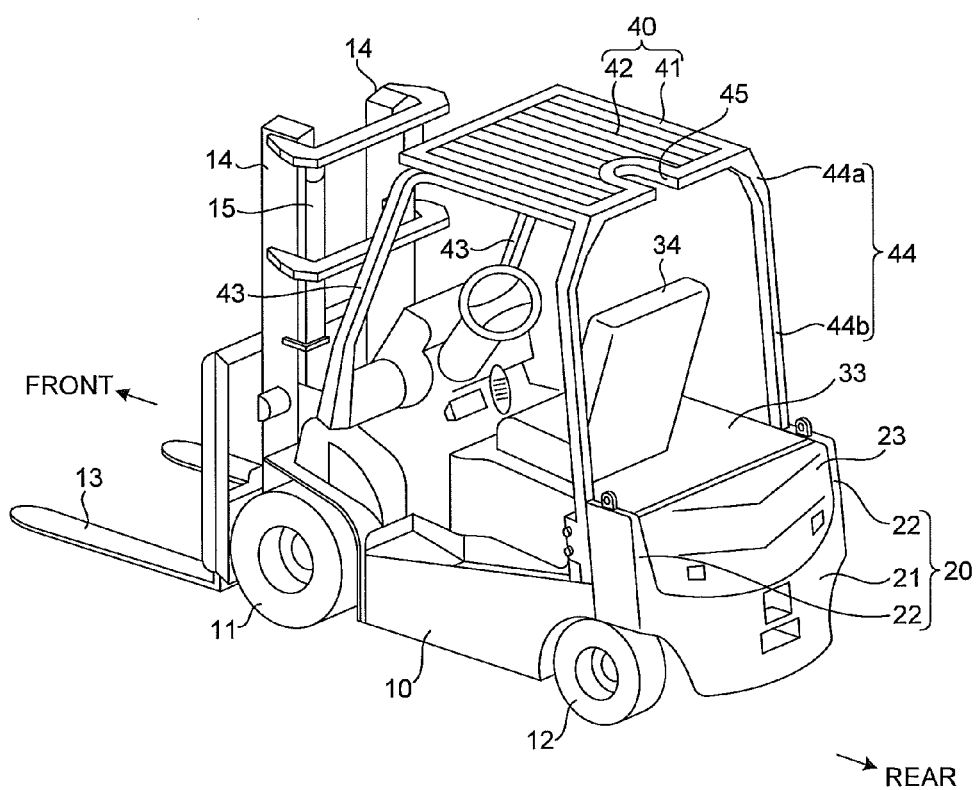
FIG. 4 is a perspective view of the battery type forklift illustrated in FIG. 1 viewing from the rear side.

A counter weight 20 is arranged at a rear end part of the vehicle body 10. The counter weight 20 being a metal-made weight for valancing when the fork 13 supports a package is laid from a part above the rear wheel 12 to a part of a rear end of the vehicle body 10. As is evident from FIG. 3 as well, the counter weight 20 is formed to have a concave portion at an upper face thereof being opened in the front-rear direction. Specifically, the counter weight 20 having the concave portion at the upper face thereof is structured by arranging a pair of post-like members 22 at both sides of a weight body 21 having a flat upper face in an upward-protruded manner. The post-like members 22 are convex portions having guide faces 22a which are mutually in parallel along the front-rear direction of the vehicle body 10 as being protruded to the upper side and the front side of the vehicle body 10 from mutually-faced sections at both sides of the weight body 21 and are molded by casting integrally with the weight body 21. Here, a resin-made weight cover 23 which covers a rear face of the counter weight 20 is illustrated in FIGS. 4 and 5.

Figure 2:
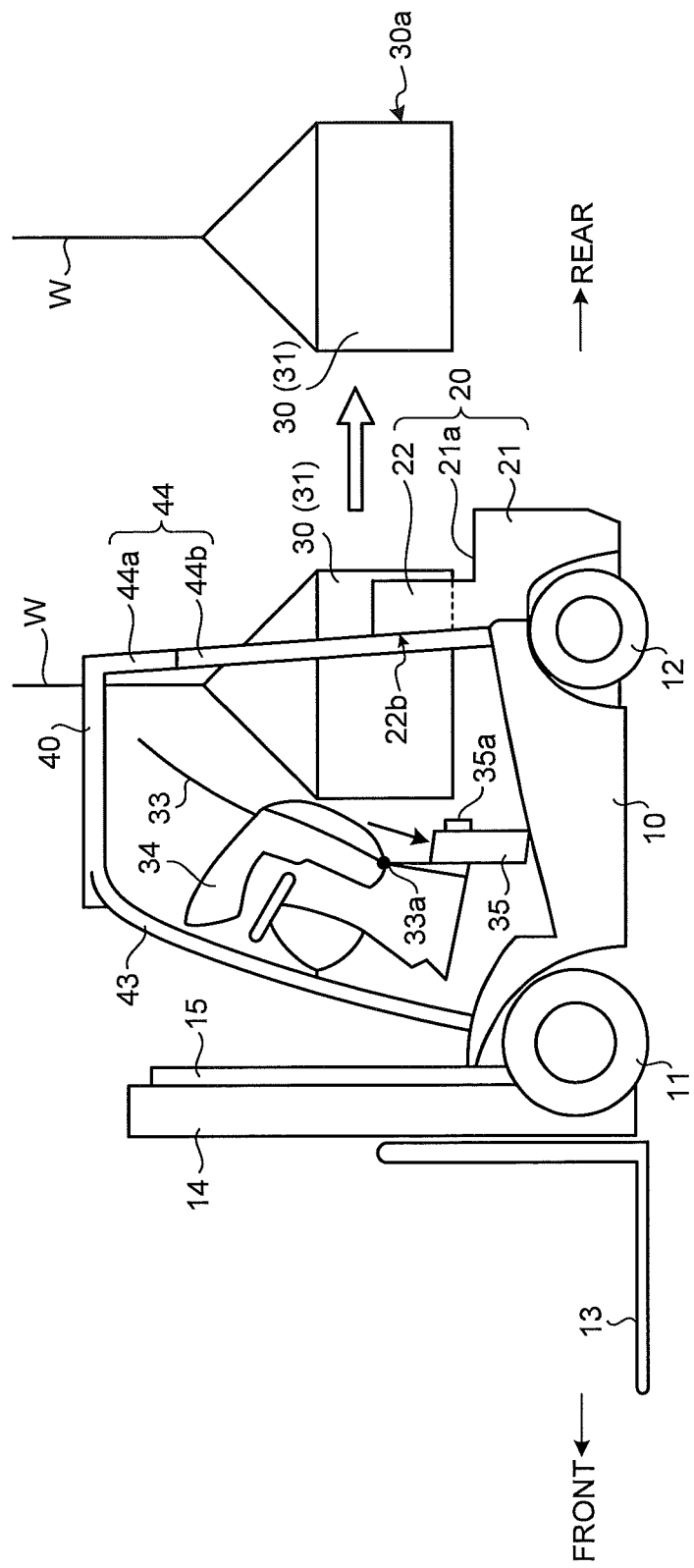
FIG. 2 is a side view of a state that loading-unloading operation of a battery is performed in the battery type forklift illustrated in FIG. 1.
Figure 5:
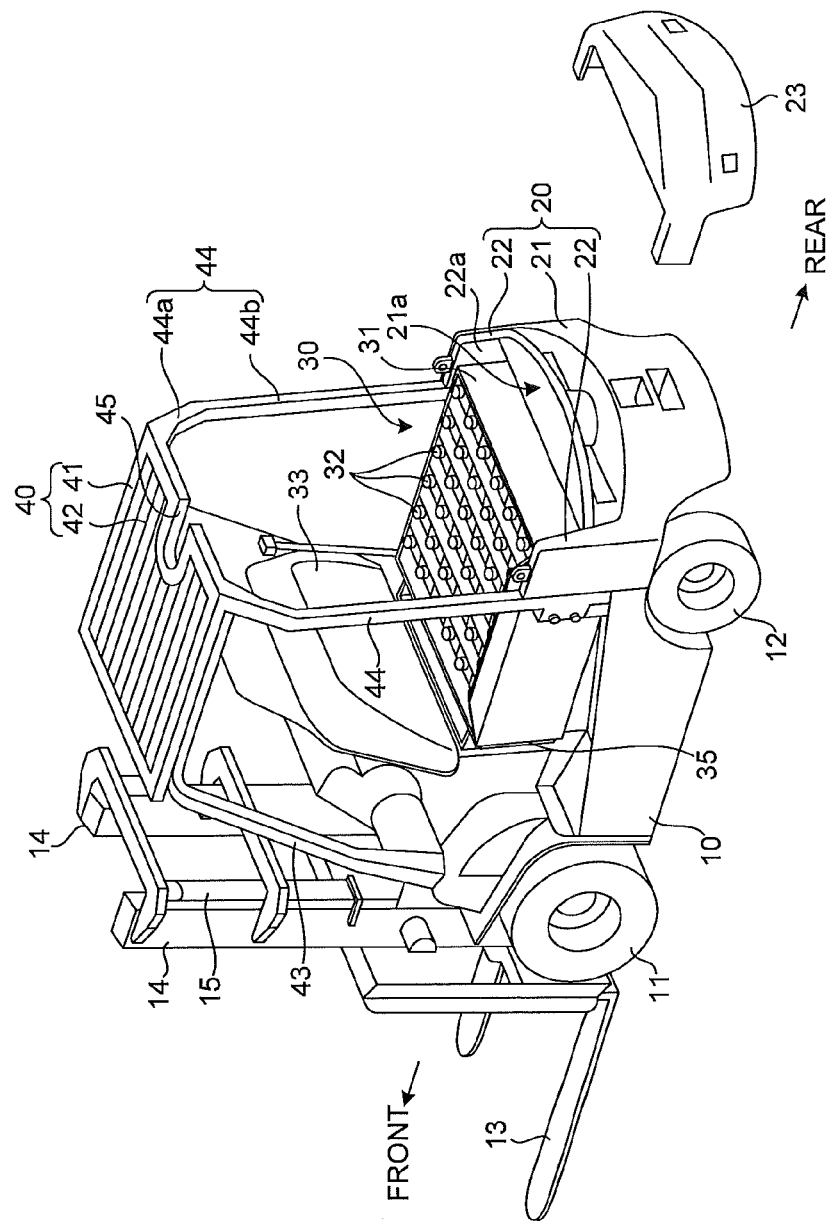
FIG. 5 is a perspective view of a state that a battery hood is tilted and the battery is exposed in the battery forklift illustrated in FIG. 1 viewing from the rear side.

As illustrated in FIGS. 1, 2 and 5, a battery 30 being a power source is mounted at a center part of the vehicle body 10. The battery 30 is structured by storing a number of battery cells 32 at the inside of a battery case 31 which is shaped like a rectangular solid having an opened upper face. As illustrated in FIG. 3, the battery case 31 has a dimension along the right-left direction of the vehicle body 10 set slightly smaller than a distance between the mutual guide faces 22a formed at the post-like members 22 as being capable of passing between the mutual post-like members 22. As illustrated in FIGS. 1, 2, 5 and 7, the battery 30 is mounted on a battery mount face 16 (FIG. 7) which is set at the front side from a front face of the weight body 21 and at the lower side from an upper face of the weight body 21 at the vehicle body 10. The battery mount face 16 is set to be located so as to be overlapped with the counter weight 20 as an upper rear end part of the battery 30 being interposed between the mutual post-like members 22 when the battery 30 is mounted on an upper face thereof. A part of the counter weight 20 facing to the upper rear end part of the battery 30 functions as an abutting portion 21a which restricts movement of the battery 30 to the rear side of the vehicle body 10 by being abutted to the battery 30. The abutting portion 21a may be abutted to the battery 30 as being shaped like a flat plane or may be abutted to the battery 30 as being protruded as a plurality of convex portions. Further, as illustrated in FIG. 1, location of the above is set so that a front end face 22b of the post-like member 22 is located at the front side from a rear end face 30a of the battery 30 when the battery 30 is mounted on the battery mount face 16.

A battery hood 33 is arranged above the battery 30 mounted on the battery mount face 16, and further, a driver seat 34 is arranged at an upper face of the battery hood 33. The battery hood 33 is sized sufficiently large to cover an upper face of the battery case 31 and a front end edge thereof is supported by a support bracket 35 of the vehicle body 10 via a support shaft 33a along the right-left direction of the vehicle body 10. By being rotated about the axial center of the support shaft 33a, the battery hood 33 is capable of being moved to a horizontal position to cover the upper side of the battery 30 as illustrated in FIG. 1 and to a frontward-tilted position to open the upper side of the battery 30 as illustrated in FIG. 2 by having a rear end edge thereof thrown up upward. In a case that the battery hood 33 is moved to the frontward-tilted position, the battery 30 can be lifted to a height position (hereinafter, called a battery transfer position) where a bottom face of the battery case 31 is slightly above an upper face of the weight body 21 without causing mutual interference between the battery hood 33 and the battery case 31, as illustrated in FIGS. 2 and 6.

Figure 6:
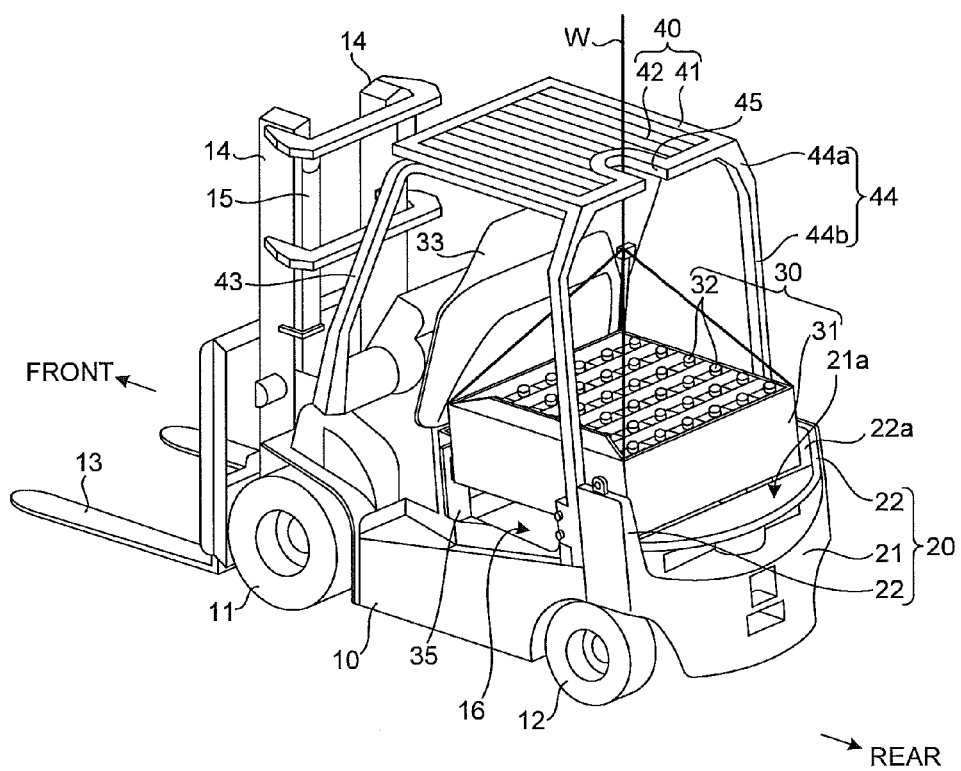
FIG. 6 is a perspective view of a state that the battery is hoisted in the battery type forklift illustrated in FIG. 1 viewing from the rear side.
Figure 7:
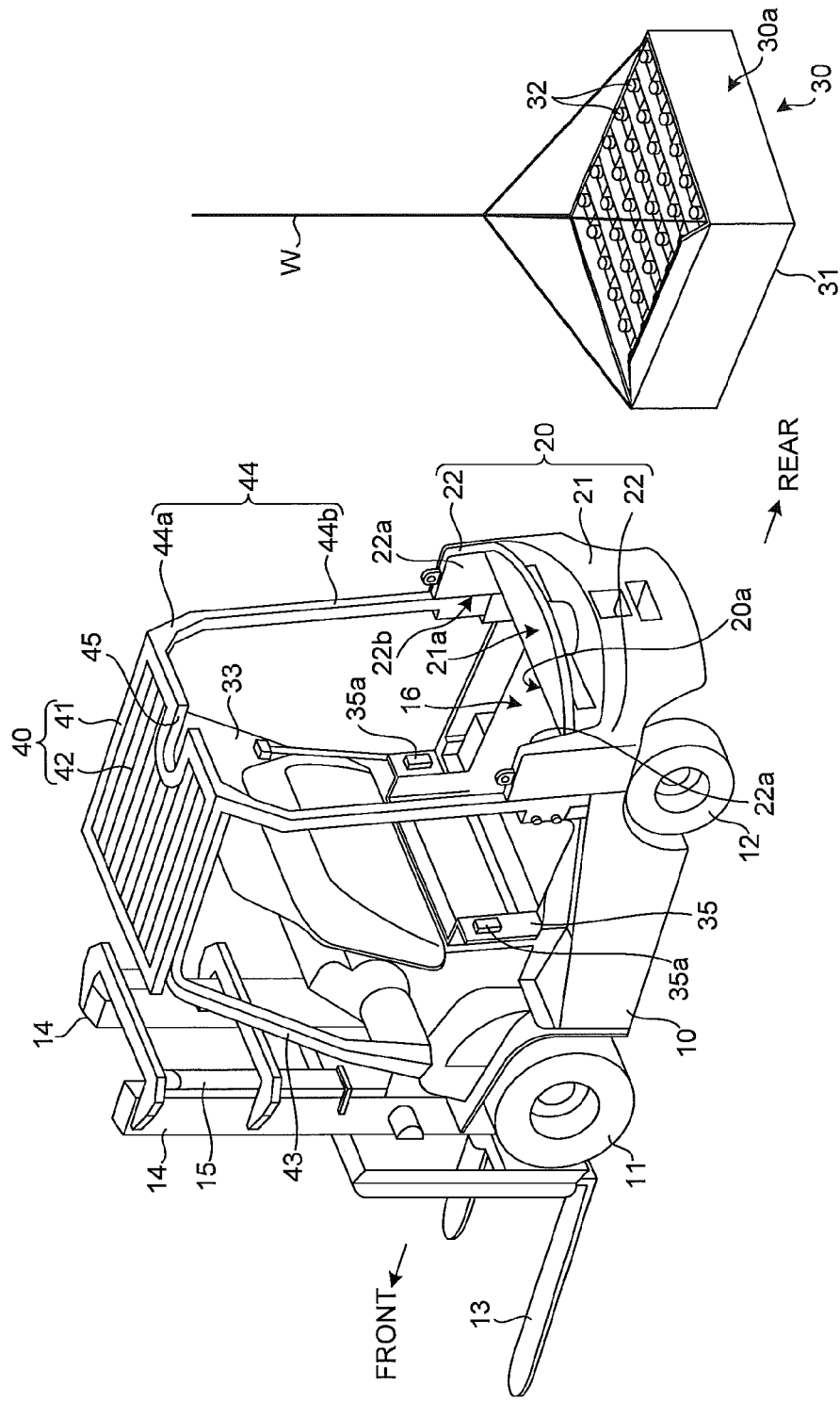
FIG. 7 is a perspective view of a state that the battery is removed to the rear side in the battery type forklift illustrated in FIG. 1 viewing from the rear side.

As illustrated in FIGS. 2, 6 and 7, the support bracket 35 which supports the battery hood 33 is arranged as being raised upward from a part positioning at a front end of the battery mount face 16 and a cushion material 35a is arranged at a face thereof positioning at the rear side of the vehicle body 10. The cushion material 35a formed like a rectangular solid with elastic material such as rubber is attached so that the longitudinal direction is oriented vertically. The cushion material 35a is arranged as the longitudinal direction being oriented vertically to be capable of being abutted to a front face upper part of the battery case 31 when the battery 30 is mounted on the battery mount face 16 and being abutted to a front face of the battery case 31 even when the battery 30 is lifted to the battery transfer position.

Meanwhile, as illustrated in FIGS. 1 to 4, a top plate 40 is arranged at the upper side of the vehicle body 10. The top plate 40 is structured by arranging a plurality of bars 42 at an approximately rectangular frame body 41 having a size to cover an area above the driver seat 34 and a dimension thereof along the right-left direction of the vehicle body 10 is set smaller than the vehicle body 10. The top plate 40 is attached to the vehicle body 10 via a pair of front stays 43 and a pair of rear stays 44.

As illustrated in FIGS. 1 and 3, the front stays 43 are extended downward from front end corners of the top plate 40 as being tilted frontward and each lower end part thereof is fixed to a front end part of the vehicle body 10. A mutual distance ("a" in FIG. 3) of the front stays 43 is approximately the same over the entire length.

In contrast, the rear stays 44 respectively have an expanding portion 44a which is linearly protruded sideward to be gradually apart from each other toward the lower side from rear end corners of the top plate 40 and a stay body 44b which is extended downward to be approximately vertical from a lower end part of the expanding portion 44a as each lower end part thereof being fixed to the rear end part of the vehicle body 10. The stay bodies 44b which are arranged in parallel to each other in the rear stays 44 have a mutual distance ("b" in FIG. 3) being approximately the same as a mutual distance of the guide faces 22a arranged at the post-like members 22 enabling the battery case 31 and the battery hood 33 to pass therethrough. The joint position between the stay body 44b and the expanding portion 44a is set at a position as high as possible so that the battery hood 33 is not interfered with the rear stay 44 even when being moved from the horizontal position to the frontward-tilted position and that the battery 30 is not interfered with the battery case 31 even when being placed at the battery transfer position.

As illustrated in FIG. 5, a slit 45 is formed at the top plate 40. The slit 45 is formed from a rear end of the top plate 40 to the front side along the front-rear direction of the vehicle body 10 as being arranged to have a front end part thereof located at the front side from the center point of a dimension of the battery 30 in the front-rear direction.

The battery type forklift structured as described above is used for loading-unloading operation in a state that the battery 30 mounted on the battery mount face 16 is covered with the battery hood 33 and the rear face of the counter weight 20 is covered with the weight cover 23. That is, owing to operation of a driver sitting on the driver seat 34, driving is performed by the electric motor (not illustrated) via the front wheels 11 and the rear wheels 12 and desired loading-unloading operation can be performed by appropriately raising and lowering the fork 13.

Here, according to the abovementioned battery forklift, a part of the battery 30 is mounted on the vehicle body 10 in a state that the part of the battery 30 is located at the rear side across the rear stay 44 which supports the top plate 40 as being overlapped with the counter weight 20. Therefore, the weight of the battery 30 effectively functions as a balancing weight and the vehicle body 10 can be structured as remarkably reducing the weight of the counter weight 20 itself. Accordingly, energy saving can be achieved such that power consumption of the battery 30 is reduced as lightening the weight of the vehicle body 10, and the like.

In addition, since the battery 30 is mounted at a position above the rear wheels 12, a dimension of the battery 30 along the right-left direction can be ensured to be large. Therefore, even in a case that the battery 30 having the same weight is mounted, the battery 30 can be placed at the further rear side of the vehicle body 10 as reducing the dimension of the battery 30 along the right-left direction. Accordingly, it is possible to utilize as the balancing weight more effectively.

Further, the concave portion is formed at the upper face of the counter weight 20 through which the battery case 31 can pass in the front-rear direction and the mutual distance between the rear stays 44 which support the top plate 40 is also formed in size to enable the battery case 31 to pass therethrough. Furthermore, the slit 45 is formed at the top plate 40 as being extended along the front-rear direction and opened to the rear end thereof. Accordingly, when the weight cover 23 is removed and the battery hood 33 is moved to the frontward-tilted position as illustrated in FIG. 5 and hoisting is performed with a wire W from the above state as illustrated in FIG. 6, the battery 30 can be lifted to the battery transfer position. When the battery 30 is directly translated to the rear side, the battery 30 can be removed from the vehicle body 10, as illustrated in FIG. 7. In a case of mounting the battery 30 on the vehicle body 10, it is only required to perform the reverse operation.

During the above, there is no obstruction with the rear stays 44 arranged at the sides of the vehicle body 10 and ancillary operation such as detaching-attaching the rear stays 44 is not required when moving the battery 30 in the front-rear direction of the vehicle body 10. Accordingly, there is not a fear that operability of loading-unloading of the battery 30 is diminished.

In addition, since the post-like members 22 are arranged at both sides of the upper face of the weight body 21 of the counter weight 20, the guide face 22a formed at each post-like member 22 becomes to a guide when the battery 30 is moved in the front-rear direction of the vehicle body 10. Accordingly, there is not a fear to cause problems of collision of the battery 30 during being transferred with another component as being swayed in the right-left direction of the vehicle body, mutual damage thereof, and the like.

Similarly, since the cushion material 35a is arranged at the support bracket 35 which supports the battery hood 33, even when the battery case 31 collides with the support bracket 35 by momentum of mounting the battery 30, there is not a fear to cause severe damage for both thereof.

Figure 8:
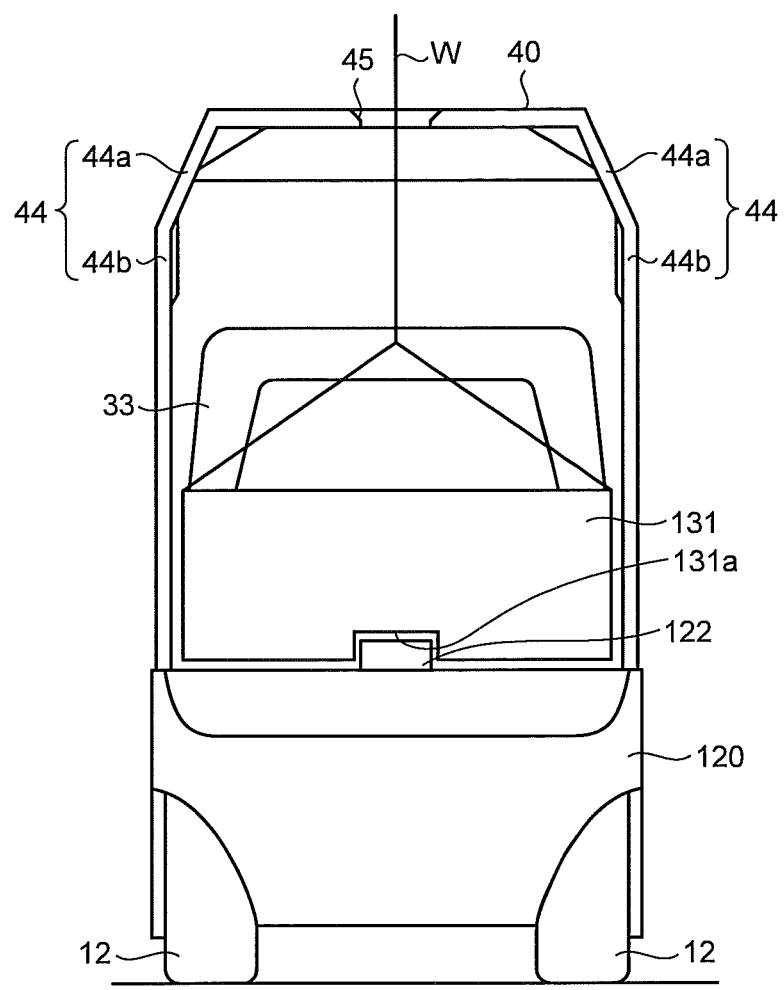
FIG. 8 is a rear view of a battery type forklift of a second embodiment of the present invention.

Here, in the abovementioned first embodiment, the pair of post-like members 22 is arranged only at the counter weight 20 and the battery 30 is to be guided between the post-like members 22. However, the present invention is not necessarily limited to the above. For example, in a second embodiment illustrated in FIG. 8, a protruded stripe portion 122 extended in the front-rear direction is arranged at the center part of an upper face of a counter weight 120 and a guide groove 131a enabling the protruded stripe portion 122 to be inserted therethrough is arranged at a bottom face of a battery case 131. In the second embodiment as well, owing to that the protruded stripe portion 122 is inserted to the guide groove 131a, the protruded stripe portion 122 and the guide groove 131a function as the guide for moving the battery 30 in the front-rear direction of the vehicle body 10. Accordingly, there is not a fear to cause problems of collision of the battery 30 during being transferred with another component as being swayed in the right-left direction of the vehicle body, mutual damage thereof, and the like.

Figure 9:
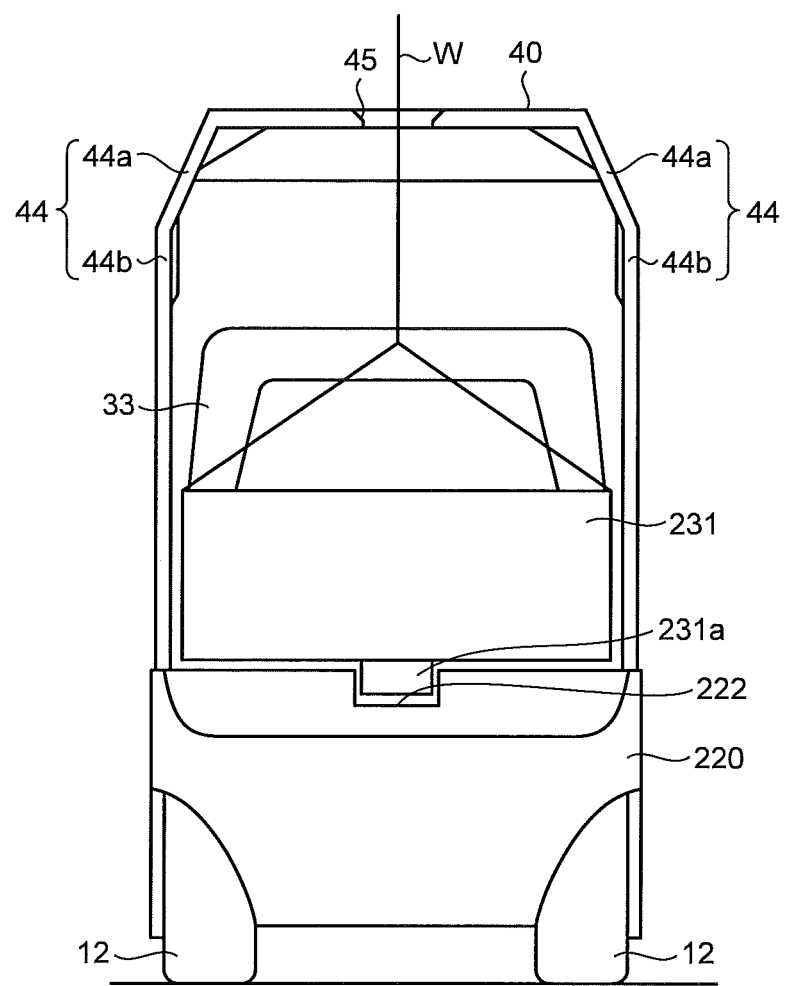
FIG. 9 is a rear view of a battery type forklift of a third embodiment of the present invention.

Similarly, in a third embodiment illustrated in FIG. 9, a guide groove 222 is arranged at the center part of an upper face of a counter weight 220 along the front-rear direction and a protruded stripe portion 231a capable of being inserted to the guide groove 222 is formed at a bottom face of a battery case 231. In the third embodiment as well, owing to that the protruded stripe portion 231a is inserted to the guide groove 222, the protruded stripe portion 231a and the guide groove 222 function as the guide for moving the battery 30 in the front-rear direction of the vehicle body 10. Accordingly, there is not a fear to cause problems of collision of the battery 30 during being transferred with another component as being swayed in the right-left direction of the vehicle body, mutual damage thereof, and the like.

Here, in the second embodiment and the third embodiment, the same numeral is given to the same structure of the first embodiment and detailed description thereof will not repeated.

Further, each of the abovementioned first to third embodiments exemplifies the battery which stores a number of battery cells in the battery case. However, the structure of the battery is not limited thereto.

REFERENCE SIGNS LIST

10 Vehicle body
13 Fork
16 Battery mount face
20 Counter weight
21 Weight body
21a Abutting portion
22 Post-like member
22a Guide face
22b Front end face
30 Battery
30a Rear end face
40 Top plate
44 Rear stay
120 Counter weight
122 Protruded strip portion
131 Battery case
131a Guide groove
220 Counter weight
222 Guide groove
231 Battery case
231a Protruded strip portion

The invention claimed is:
1. A battery-powered forklift, comprising:
a vehicle body, which body has a front end and a rear end;
a battery mounted on the vehicle body;
a fork arranged at the front end of the vehicle body; and
a counterweight arranged at a rear part of the vehicle body and mounted on the vehicle body, wherein the counterweight comprises post members, the post members protruding upwardly from the counterweight and arranged at both left and right sides of the counterweight as seen from the rear end of the vehicle body, wherein the post members guide movement of the battery when the battery is moved from the rear part to the rear end of the vehicle body along a front-rear direction of the vehicle body.

2. The battery-powered forklift according to claim 1, wherein the post members are formed by casting integrally with the counter weight.

3. The battery-powered forklift according to claim 1, wherein the counter weight comprises an abutting portion which restricts the movement of the battery to a rear side of the vehicle body when the battery is mounted on the vehicle body.

4. The battery-powered forklift according to claim 1, wherein the post members comprise surfaces facing the front end of the vehicle body, which surfaces are located anteriorly of a surface of the battery that faces the rear end when the battery is mounted on the vehicle body.

\* \* \* \* \*